United States Patent
Wagner, Jr.

[11] Patent Number: 5,552,045
[45] Date of Patent: Sep. 3, 1996

[54] SLIDING SHOE UNIT FOR AUTOMATIC BACKWASH FILTERS

[75] Inventor: Gerald S. Wagner, Jr., Tyrone, Pa.

[73] Assignee: Infilco Degremont Inc., Richmond, Va.

[21] Appl. No.: 592,590

[22] Filed: Jan. 26, 1996

[51] Int. Cl.⁶ .................................................. B01D 24/46
[52] U.S. Cl. ........................ 210/264; 210/296; 210/271; 210/273; 210/275
[58] Field of Search ............................ 210/264, 271, 210/273, 274, 275, 269

[56] References Cited

U.S. PATENT DOCUMENTS

| | | | |
|---|---|---|---|
| 2,302,449 | 11/1942 | Laughlin | 210/273 |
| 2,459,353 | 1/1949 | Woods | 210/279 |
| 3,239,061 | 3/1966 | Horning et al. | 210/793 |
| 3,262,878 | 7/1966 | Beckley et al. | 210/278 |
| 4,133,766 | 1/1979 | Adie | 210/275 |
| 4,152,265 | 5/1979 | Meyers | 210/273 |
| 4,235,718 | 11/1980 | Lopez | 210/278 |
| 4,454,034 | 6/1984 | Astrom et al. | 210/275 |
| 4,540,487 | 9/1985 | Johnson et al. | 210/264 |
| 4,617,131 | 10/1986 | Walker | 210/277 |
| 4,764,288 | 8/1988 | Walker et al. | 210/793 |
| 4,765,889 | 8/1988 | Grujanac | 210/276 |
| 4,859,330 | 8/1989 | Pauwels | 210/264 |
| 4,988,439 | 1/1991 | Medders, II | 210/273 |
| 5,078,873 | 1/1992 | Black et al. | 210/264 |
| 5,089,117 | 2/1992 | Nichols | 210/93 |
| 5,147,560 | 9/1992 | Nichols | 210/745 |
| 5,362,384 | 11/1994 | Whetsel | 210/275 |
| 5,401,405 | 3/1995 | McDougald | 210/273 |
| 5,431,809 | 7/1995 | McDougald | 210/275 |
| 5,476,584 | 12/1995 | McDougald | 210/108 |

Primary Examiner—Cynthia L. Nessler
Attorney, Agent, or Firm—Carroll F. Palmer

[57] ABSTRACT

Articulated sliding shoes for improving the operation of automatic backwashing filter systems basically include (a) a rectangular support frame, (b) a central valve member, (c) a fore waste valve member, (d) an aft waste valve member and (e) sets of springs for such valve members. The valve members are moveable relative to the support frame transverse of its longitudinal axis, but are immoble parallel to such axis and are urged by the spring sets into seriatim contact with trios of the discharge ports of the filter cells of such filter systems.

10 Claims, 3 Drawing Sheets

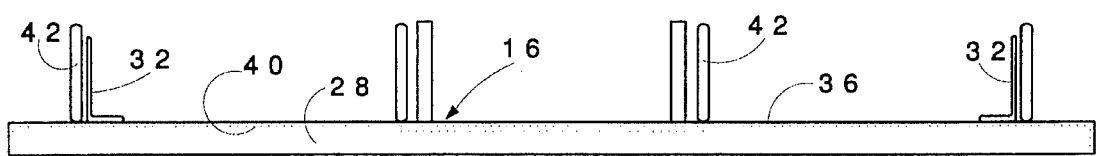
FIG.9
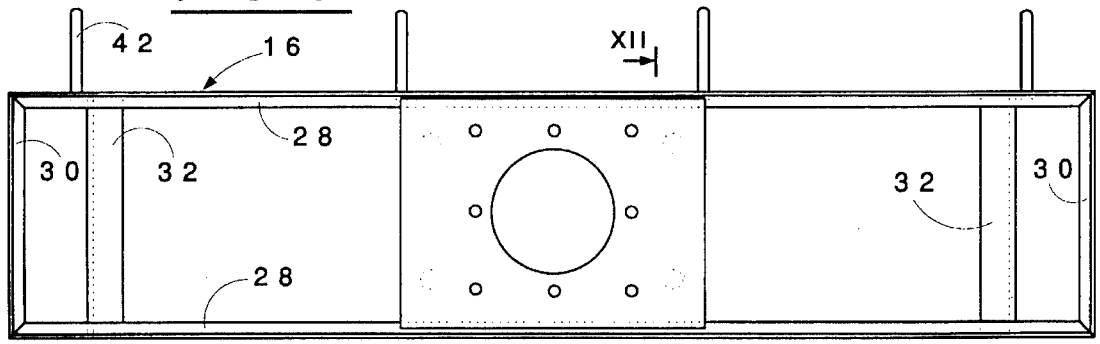
FIG.10
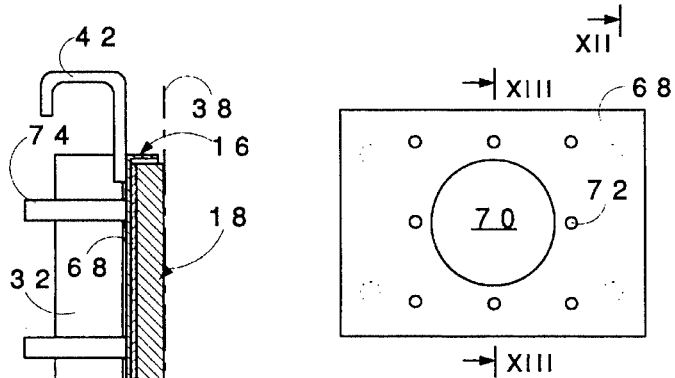
FIG.12
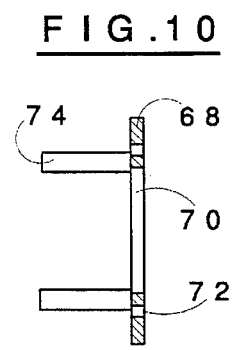
FIG.11
FIG.13
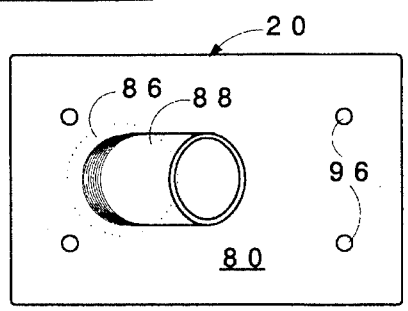
FIG.14
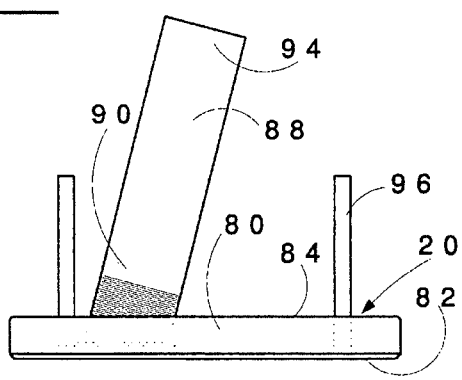
FIG.15

5,552,045

SLIDING SHOE UNIT FOR AUTOMATIC BACKWASH FILTERS

BACKGROUND OF THE INVENTION

1. Field of the Invention

This application relates broadly to automatic backwash, seriated beds filter systems. More particularly, it is concerned with a new type of sliding shoe unit used to seriately backwash the multiple filter beds in such filter systems.

2. Description of the Prior Art

Automatic backwash filter systems that include a filter tank divided into a multiplicity of filter beds of substantially the same width by a plurality of vertical cell sheets are a know type of equipment used in water treatment plants. Such automatic backwash filter systems (ABWS) are exemplified in U.S. Pat. Nos. 3,239,061; 4,133,766; 4,617,131; 4,764,288 and 5,089,130 currently assigned to Infilco Degremont Inc., the assignee of the invention disclosed herein. The disclosures of these patents are incorporated herein by reference.

Typically the ABWS include a wear strip through which extend base ports for each separate cell and a sliding shoe which moves along the wear strip to seriately address the cell ports in the progressive backwashing of the filter cells. In conventional ABWS, the sliding shoe has three ports, i.e., one backwash port in the center and two filter to waste ports, i.e., one forward and one behind the backwash port. In some systems, the sliding shoe may comprise additional ports on one or both sides of the single backwash port.

In conducting the backwash of filter cells, a carriage moves the sliding shoe from a first backwashed cell to an adjacent second cell so it can be backwashed. This second cell is then washed with wash water entering the shoe's center backwash port. At the same time, the shoe's trailing filter to waste port is positioned at the effluent port of the first cell, backwashed just previous to the one currently being backwashed.

This first cell is now filtering, but the water being discharged from the cell's effluent port is the remainder of the wash water that was in the media bed at the end of the wash. Since it may contain some suspended matter and not meet the requirements of an acceptable filter effluent, it is directed to waste. Typically, the filters are constructed so this sliding shoe is positioned in the filter effluent channel. Therefore, it is important to maintain a positive seal between the filter to waste port in the sliding shoe and the wear strip to prevent water exiting from the first cell that may contain some suspended matter from entering the effluent channel and combining with the properly filtered water. The necessary seal is provided by holding the shoe tightly against the wear strip via spring or other applied pressures. The present invention provides an apparatus for mitigation of any leakage of water containing suspended solids into the effluent channel.

When sequentially backwashing a plurality of seriate filter beds, it is advantageous to end the backwash cycle of any given media bed not only on a time basis as is usually employed, but in addition, determining when suspended solids are no longer exiting the filter and adequately filtered water is being produced. In this method the carriage moves to backwash the next serial filter cell only after it has been determined that the filter to waste water from the first filter cell no longer contains suspended matter and the time allotted for the backwash of the second filter cell has expired. A turbidimeter or a particle counter can be used to determine when suspended solids have been reduced to the desired level (see U.S. Pat. No. 5,089,117).

In such monitoring procedures, validity of the instrument responses can be questionable if cross contamination occurs because of poorly sealed ports between the sliding shoe used to direct the flow of filter backwash water to a second filter cell and the filter to waste stream of a first filter and the wear strip. The present invention provides an apparatus for mitigation of potential cross contamination.

OBJECTS

A principal object of the invention is the provision of new improvements in sliding shoes of automatic backwash seriated beds filter systems.

An additional object is the provision of ABWS sliding shoes that mitigate potential cross contamination during operation of such filter systems.

A further object is the provision of such ABWS sliding shoes that minimize friction between the sliding shoe and the wear plate.

Another object is the provision of such sliding shoes that can be effectively used with ABWS that do not employ a wear strip.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

To eliminate spurious responses resulting from cross contamination, a backwash shoe is needed that is sufficiently flexible to adapt itself to surface variations in the wear plate an/or equal pressures exerted on different portions of the shoe. This flexibility can be achieved by several means, among them a shoe constructed of a flexible or elastomeric material or articulating a rigid material. In accordance with the present invention, the desired flexibility is attained by providing an articulated shoe with a segmented sliding surface.

The objects are accomplished in accordance with the invention by the provision of improvements in known automatic backwash filter systems which include a filter tank divided into a multiplicity of filter cells of substantially the same width by a plurality of vertical cell sheets, the filter cells each having at their base a port for liquid to pass into and out thereof. All the base ports are spaced apart substantially an equal distance, and a sliding shoe moves under the control of a carriage assembly seriately into contact with trios of the equally spaced ports of the separate filter cells.

The improvement of the invention is an articulated sliding shoe basically comprising (a) a support frame, (b) a central valve member, (c) a fore waste valve member, (d) an aft waste valve member and (e) pressure means to urge the valve members into operative contact with the filter ports.

The carriage assembly includes dependent mounting means for supporting the sliding shoe and controlling its seriatim movement into contact with the spaced ports.

The support frame, preferably of rectangular shape, is formed of longitudinal rigid parts, e.g., a first spaced pair of L-shaped metal bars, and of transverse rigid parts, e.g., a second spaced pair of L-shaped metal bars. Such support frame defines a face side, a rear side, a vertical operation plane and a rear limit of movement parallel to the plane.

The central valve member includes a quadrilateral first plate defined by a first front side and a first rear side. It has a first port therein for seriatim connection to the filter cells for backwashing thereof and is carried by the support frame with its first front side aligned parallel to the operation plane.

The fore waste valve member includes a quadrilateral second plate defined by a second front side and a second rear side. It has a second port therein for seriatim connection to the filter cells for disposal of waste liquid therefrom and is carried by the support frame with the second front side aligned parallel to the operation plane.

The aft side valve member includes a quadrilateral third plate defined by a third front side and a third rear side. It has a third port therein for seriatim connection to the filter cells for disposal of waste liquid therefrom and is carried by the support frame with the third front side aligned parallel to the operation plane.

Corners of the support frame and valve members may be filleted in some embodiments.

The first, second and third plates are moveable within the support frame perpendicularly away from the rear limit of movement, but are substantially immobile parallel to the operation plane.

First pressure means urges the first plate perpendicularly away from the rear limit of movement, second pressure means urges the second plate perpendicularly away from the rear limit of movement and third pressure means urges the third plate perpendicularly away from the rear limit of movement.

Advantageously, the first, second and third pressure means comprise first, second and third sets of springs mounted on brackets carried by mounting means that depends from the carriage that moves the improved sliding articulated shoe. The first set of springs engage the first rear side of the central valve member, the second set of springs engage the second rear side of the fore waste valve member and the third set of springs engage the third rear side of the aft waste valve member.

The first, second and third ports are spaced apart substantially the same equal distance as the ports of the filter cells.

The first port of the central valve member is connected to first pump means to perform the seriatim backwashing of the filter cells.

The second and third ports of the fore and aft valve members are connected to second pump means to perform the disposal of waste liquid from the filter cells. Advantageously, the second pump means includes a pair of pumps to alternatively enable only one of the second or third ports to perform at any given time the disposal of waste liquid from the filter cells.

BRIEF DESCRIPTION OF THE DRAWINGS

A more complete understanding of the invention can be obtained by reference to the accompanying drawings in which:

FIG. 9 is lateral view of the valves support frame weldment of the sliding shoe unit of FIG. 2.

FIG. 10 is a plan view corresponding to FIG. 9.

FIG. 11 is a plan view of the spring plate member of the sliding shoe unit of FIG. 2.

FIG. 12 is a sectional view taken on the line XII—XII of FIG. 10.

FIG. 13 is a sectional view taken on the line XIII—XIII of FIG. 11.

FIG. 14 is a plan view of a waste valve member of the sliding shoe unit of FIG. 2.

FIG. 15 is a lateral view corresponding to FIG. 14.

DESCRIPTION OF THE PREFERRED EMBODIMENTS

For a detailed description of the invention, reference is made to the drawings in which generic parts of the illustrated matter are indicated by arrowhead lines associated with the designation numerals and specific parts are indicated with plain lines associated with the numerals.

Figure 1:
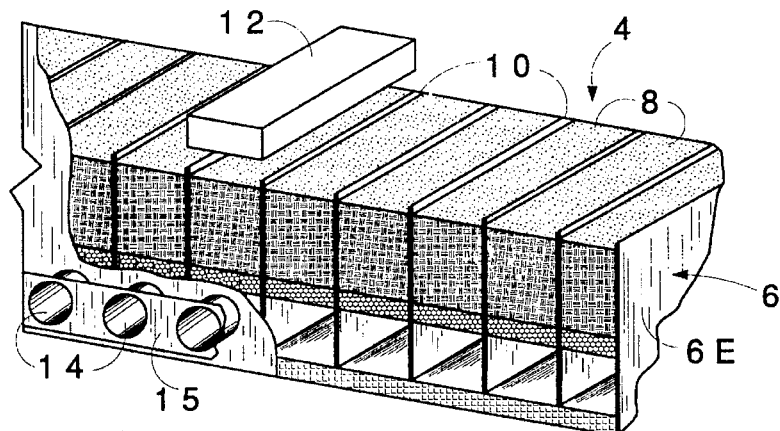
FIG. 1 is an isometric fragmentary view of a typical prior art automatic backwash filter apparatus for which the invention provides an improved sliding shoe unit.
Figures 2, 3:
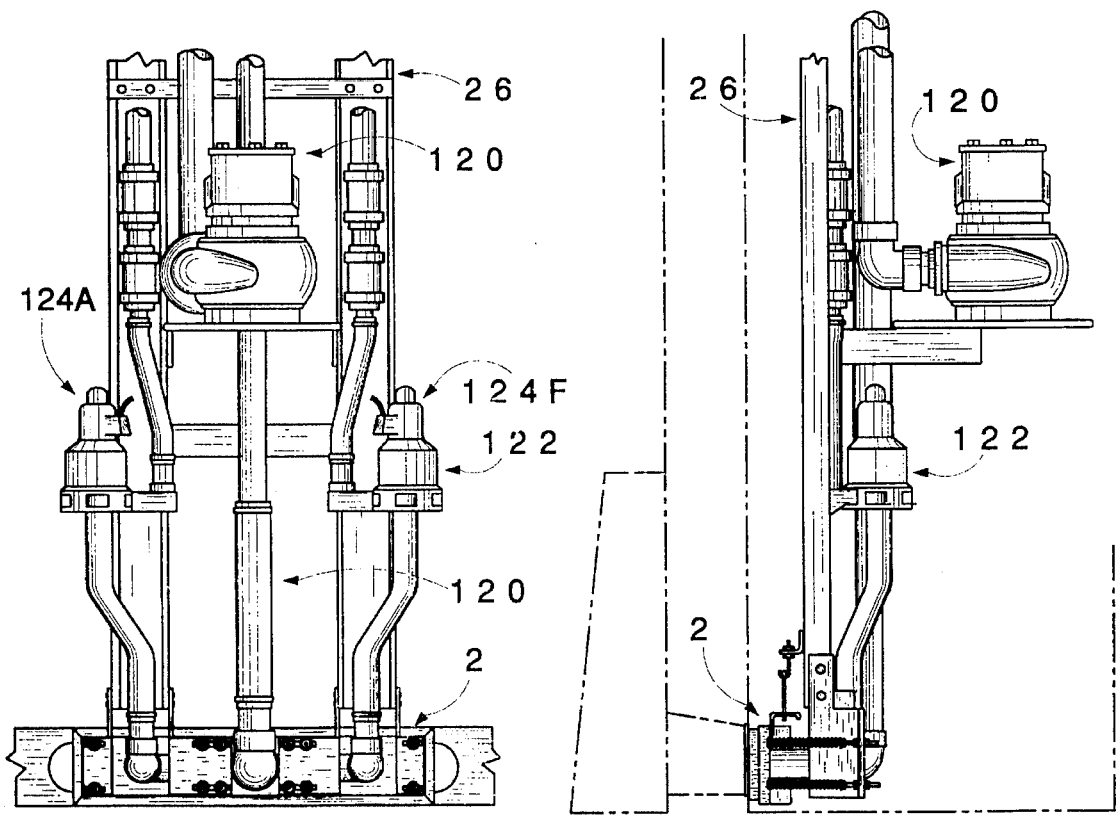
FIG. 2 is a fragmentary vertical frontal view of automatic backwash filter apparatus equipped with a sliding shoe unit constructed in accordance with the invention.
FIG. 3 is a fragmentary vertical lateral view corresponding to FIG. 2.
Figure 4:
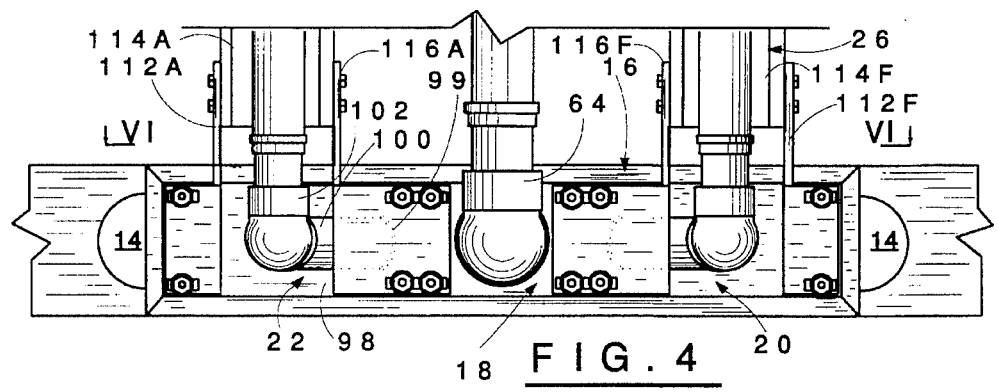
FIG. 4 is a fragmentary enlarged view of the lower portion of FIG. 2.
Figure 5:
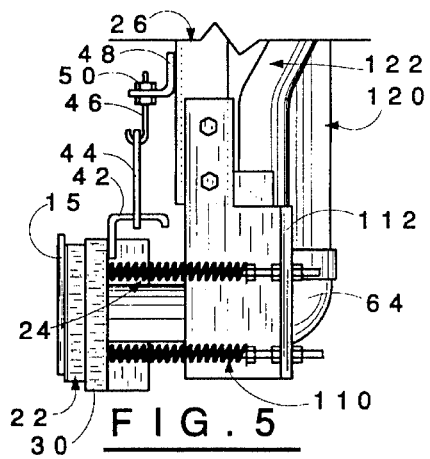
FIG. 5 is a fragmentary enlarged view of the lower portion of FIG. 3.
Figure 7:
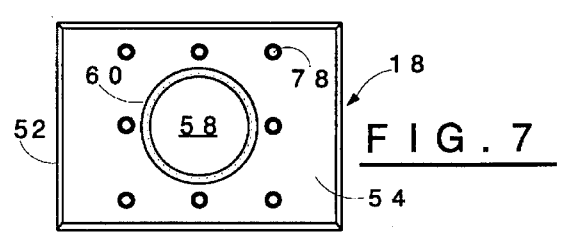
FIG. 7 is a plan view of the backwash valve member of the sliding shoe unit of FIG.
Figure 8:
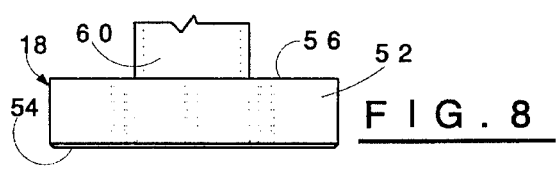
FIG. 8 is a lateral view corresponding to FIG. 7.

The articulated sliding shoe 2 of the invention is a improvement on prior art automatic backwash filter systems 4 diagrammatically shown in FIG. 1 which include a filter tank 6 divided into a multiplicity of filter cells 8 of substantially the same width by a plurality of vertical cell sheets 10 and a carriage assembly 12 for moving a prior art type sliding shoe (not shown).

The filter cells 8 each have at their base a port 14 for liquid to pass into and out thereof. Such base ports are spaced apart substantially an equal distance, and the sliding shoe (not shown) that moves under the control of carriage assembly 12 seriately into contact with trios of the equally spaced ports 14 of the separate filter cells 8 that extend thorough the wear strip 15.

The improvement of the invention is the articulated sliding shoe 2 that basically comprises (a) a rectangular support frame 16, (b) a central valve member 18, (c) a fore waste valve member 2!·0, (d) an aft waste valve member 22 and (e) pressure means 24 to urge such valve members into operative contact with the filter ports 14.

In describing the shoe 2, the term "fore" refers to the end of the frame 16 which is at the front of the movement of the shoe 2 as it progresses along the wear strip 15 and the term "aft" refers to the other end of the support frame 16. When the shoe reaches an end 6E of series of filter cells 8, it reverses so that the prior "fore" end then becomes the "aft" end and vis versa. In substance, the valve members 20 and 22 are mirror images of one another.

The carriage assembly 12 includes dependent mounting means 26 for supporting the sliding shoe 2 and controlling its seriatim movement into contact with the spaced ports 14.

The rectangular support frame 16 is formed of a spaced pair of longitudinal L-shaped metal bars 28 and a spaced pair of transverse L-shaped metal bars 30 strengthened by transverse angle members 32.

The support frame 16 defines a face side 34, a rear side 36, a vertical operation plane 38 and a rear limit of movement 40 parallel to the plane 38. It also includes holders 42 that serve to support the frame 16 on the mounting means 26 via link 44 and end-threaded hook 46 which is fitted to bracket 48 by adjustment nuts 50.

The central valve member 18 includes a quadrilateral plate 52 with a front side 54, a rear side 56 and a central port 58. A short nipple 60 is threaded at one end 62 into port 58 and has an elbow 64 threaded on the other end 66.

Valve member 18 functions with a quadrilateral spring plate 68 (see FIGS. 11–13) which has a large central bore 70, eight small, through holes 72 and has fixed to its rear side four spring guide lugs 74. The plate 68 is fixed to the valve member 18 by nuts and bolts 76 that extend through the bores 72 and corresponding bores 78 in the plate 54.

The fore waste valve member 20 includes a quadrilateral plate 80 with a front side 82, a rear side 84 and a longitudinally offset port 86. A long nipple 88 is threaded at one end 90 into port 86 and has an elbow 92 threaded on the other end 94. Plate 80 also carries on its rear side four spring guide rods 96.

The aft side valve member 22, which is a mirror image of valve member 20, includes a quadrilateral plate 98, port 99, long nipple 100 and elbow 102.

A first set of four springs 104 urge the plate 54 away from rear side 36 of support frame 16. Similarly, a second set of springs 106 urge valve member 20 and a third set of springs 108 urge valve member 22 away from the rear side 36 of support frame 16. These spring sets enable the valve members 18, 20, & 22 to move within the support frame 16 perpendicularly away from the rear limit of movement, but maintain them substantially immobile parallel to the operation plane 38.

Figure 6:
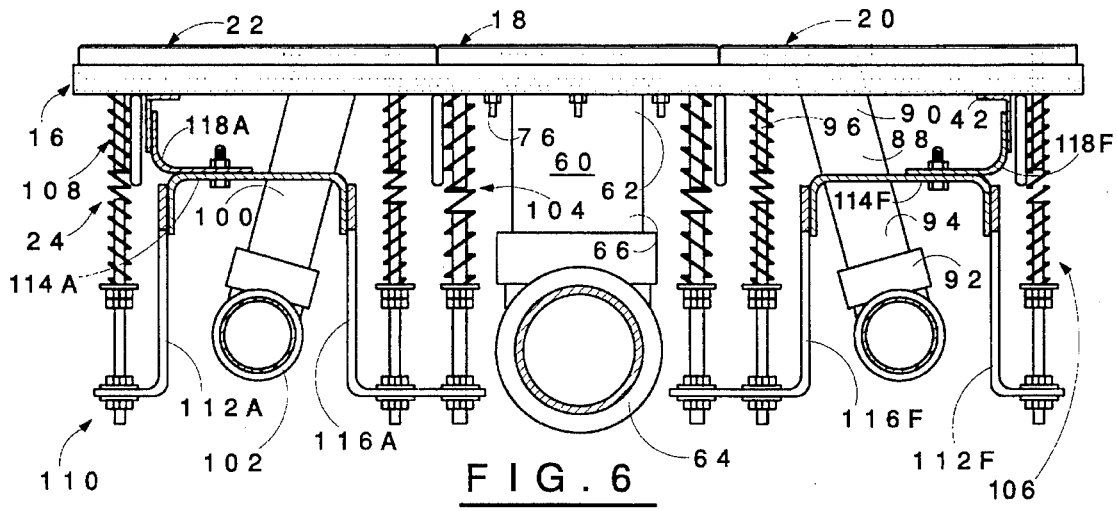
FIG. 6 is a sectional view taken on the line VI—VI of FIG. 4.

Bracket means 110, which operatively mounts the spring sets to the dependent mounting means 26, comprises end support plates 112F & 112A, dependent ends 114F & 114A of support means 26, J-members 116F & 116A and angle members 118F & 118A (see FIG. 6). The latter angle members insure that the support frame and the associated shoes move as the carriage moves.

The ports 58, 86 and 99 are spaced apart substantially the same equal distance as the ports 14 of the filter cells 18 in the filter system 4 to which the improved sliding shoes 2 of the invention are applied.

The port 58 of the central valve member 18 is connected to pump means 120 to perform the seriatim backwashing of the filter cells.

The ports 86 & 99 of the fore and aft valve members 20 & 22 respectively are connected to pump means 122 to perform the disposal of waste liquid from the filter cells. Advantageously, the pump means 122 includes alternate means to enable only one at a time of the second or third ports to perform the disposal of waste liquid from the filter cells. In the embodiment as shown, such alternate means comprises separate pumps 124F and 124A with associated plumbing. Other alternate means arrangements can be used, e.g., a single pump (not shown) with a switch valve properly plumbed to the ports 86 & 99.

I claim:

1. In an automatic backwash filter system which includes a filter tank divided into a multiplicity of filter cells of substantially the same width by a plurality of vertical cell sheets, said filter cells each having at their base a port for liquid to pass into and out thereof, all said base ports being spaced apart substantially an equal distance, and a sliding shoe that moves under the control of a carriage assembly seriately into contact with trios of said equally spaced ports of the separate filter cells, the improvement which is an articulated shoe with a segmented sliding surface, said articulated shoe comprising:

a rectangular support frame comprising a spaced pair of longitudinal rigid parts and a spaced pair of transverse rigid parts, said support frame defining a face side, a rear side, a vertical operation plane and a rear limit of movement parallel to said plane, a central valve member, including a quadrilateral first plate defined by a first front side and a first rear side and having a first port therein for seriatim connection to said filter cells for backwashing thereof, carried by said support frame with said first front side aligned parallel to said operation plane, first pressure means to urge said first plate perpendicularly away from said rear limit of movement, a fore waste valve member, including a quadrilateral second plate defined by a second front side and a second rear side and having a second port therein for seriatim connection to said filter cells for disposal of waste liquid therefrom, carried by said support frame with said second front side aligned parallel to said operation plane, second pressure means to urge said second plate perpendicularly away from said rear limit of movement, an aft side valve member, including a quadrilateral third plate defined by a third front side and a third rear side and having a third port therein for seriatim connection to said filter cells for disposal of waste liquid therefrom, carried by said support frame with said third front side aligned parallel to said operation plane, third pressure means to urge said third plate perpendicularly away from said rear limit of movement, said first, second and third plates being moveable within said support frame perpendicularly away from said rear limit of movement, but substantially immobile parallel to said operation plane, said first, second and third ports being spaced apart substantially said equal distance, said first port being connected to first pump means to perform said seriatim backwashing of said filter cells, and said second and third ports being connected to second pump means to perform said disposal of waste liquid from said filter cells.

2. The automatic backwash filter system of claim 1 wherein said longitudinal rigid parts and said transverse rigid parts are L-shaped metal bars.

3. The automatic backwash filter system of claim 1 wherein said second pump means includes a pair of pumps to alternatively enable only one of said second or third ports to perform said disposal of waste liquid from said filter cells.

4. The automatic backwash filter system of claim 1 wherein said carriage assembly includes dependent mounting means for supporting said sliding shoe and controlling its seriatim movement into contact with said spaced ports.

5. The automatic backwash filter system of claim 4 wherein said first, second and third pressure means comprise first, second and third sets of springs mounted on brackets carried by said dependent mounting means.

6. The automatic backwash filter system of claim 5 wherein said first set of springs engage said first rear side of said central valve member.

7. The automatic backwash filter system of claim 5 wherein said second set of springs engage said second rear side of said fore waste valve member.

8. The automatic backwash filter system of claim 5 wherein said third set of springs engage said third rear side of said aft waste valve member.

9. In an automatic backwash filter system which includes a filter tank divided into a multiplicity of filter cells of substantially the same width by a plurality of vertical cell sheets, said filter cells each having at their base a port for liquid to pass into and out thereof, all said base ports being spaced apart substantially an equal distance, a sliding shoe that moves seriately into contact with trios of said equally spaced ports of the separate filter cells, and a carriage assembly including dependent mounting means for supporting said sliding shoe and controlling its seriatim movement into contact with said spaced ports, the improvement which is an articulated shoe with a segmented sliding surface, said articulated shoe comprising:

a rectangular support frame comprising a spaced pair of longitudinal rigid parts and a spaced pair of transverse rigid parts, said support frame defining a face side, a rear side, a vertical operation plane and a rear limit of movement parallel to said plane, a central valve member, including a quadrilateral first plate defined by a first front side and a first rear side and having a first port therein for seriatim connection to said filter cells for backwashing thereof, carried by said support frame with said first front side aligned parallel to said operation plane, a first set of springs to urge said first plate perpendicularly away from said rear limit of movement supported by brackets fixed to said dependent mounting means, a fore waste valve member, including a quadrilateral second plate defined by a second front side and a second rear side and having a second port therein for seriatim connection to said filter cells for disposal of waste liquid therefrom, carried by said support frame with said second front side aligned parallel to said operation plane, a second set of springs to urge said second plate perpendicularly away from said rear limit of movement supported by brackets fixed to said dependent mounting means, an aft side valve member, including a quadrilateral third plate defined by a third front side and a third rear side and having a third port therein for seriatim connection to said filter cells for disposal of waste liquid therefrom, carried by said support frame with said third front side aligned parallel to said operation plane, a third set of springs to urge said third plate perpendicularly away from said rear limit of movement supported by brackets fixed to said dependent mounting means, said first, second and third plates being moveable within said support frame perpendicularly away from said rear limit of movement, but substantially immobile parallel to said operation plane, said first, second and third ports being spaced apart substantially said equal distance, said first port being connected to first pump means to perform said seriatim backwashing of said filter cells, and said second and third ports being connected to second pump means to perform said disposal of waste liquid from said filter cells.

10. The automatic backwash filter system of claim 9 wherein said longitudinal rigid parts and said transverse rigid parts are L-shaped metal bars.

\* \* \* \* \*